UNITED STATES PATENT OFFICE.

CHARLES VAUCHER, OF BASEL, SWITZERLAND, ASSIGNOR TO THE FIRM OF DYE-WORKS FORMERLY L. DURAND, HUGUENIN & CO., OF BASEL, SWITZERLAND.

LEUCO DERIVATIVES OF GALLOCYANIN ARYLIDS, &c., AND PROCESS OF MAKING SAME.

No. 929,350.  Specification of Letters Patent.  Patented July 27, 1909.

Application filed July 28, 1908. Serial No. 445,707.

*To all whom it may concern:*

Be it known that I, CHARLES VAUCHER, chemist, a citizen of the Swiss Republic, and resident of Basel, Switzerland, have invented new and useful Leuco Derivatives of the Gallocyanin Arylids and of Their Sulfo Derivates and a Process of Making Same, of which the following is a full, clear, and exact specification.

I have found that new leuco derivatives of the gallocyaninarylids and of their sulfo derivates can be obtained, when the same are reduced in a medium, which on heating does not split off the amidoary group, as for instance dilute alcohol, dilute ethyltartrate, dilute formic acid, phenol, acetin etc., by means of reducing agents which do not introduce an excess of free acid into the mass of reaction, as for instance hydrosulfites, hydrosulfite compounds or sulfoxylate compounds and the corresponding quantity of hydrochloric acid. Thus are obtained leuco derivatives of gallocyaninarylids and of their sulfo derivatives which are stable and sufficiently pure. These new leuco derivatives dye chromium-mordanted fibers pure greenish-blue tints. They have further the precious property of being fixed on cotton by a very short steaming. In the form of hydrochlorids, they are soluble in water; as paste or powder they have a greenish appearance and the colors of their solutions in sulfuric acid vary from orange to brownish-yellow and turn to deeper red on addition of an oxidizing agent. In presence of alkalies the new leuco derivatives are quickly oxidized by the oxygen of the air.

The invention is illustrated by the following examples:

Example I: To 200 liters of dilute ethylalcohol introduced into an apparatus provided with a reflux cooler are added, while stirring, 20 kilos of the gallo cyaninanilid obtained by condensing anilin with the product of reaction of nitrosodimethylanilin hydrochlorid with gallamid. The mass is then boiled for 1 to 2 hours while 8 kilos of hydrochloric-acid and 7 kilos of formaldehyde-hydrosulfite are gradually added. The reaction being terminated, the mass assumes a yellowish-green color. The alcohol is then distilled off, the product of reaction cooled down and the new leuco compound precipitated by addition of common salt.

Example II: To 100 liters of distilled water and 100 liters of ethyltartrate introduced into an apparatus provided with a reflux cooler are added 20 kilos of the gallocyaninanilid obtained by heating anilin with the product of condensation of nitrosodiethylanilin hydrochlorid with gallamid. The reduction is effected and the resulting leuco derivative is isolated as in Example I.

Example III: To a solution of 200 liters of dilute ethylalcohol introduced into an apparatus provided with a reflux cooler are added, while stirring, 24 kilos of the sulfo derivative of the gallocyaninanilid obtained by condensing anilin with the product resulting from the condensation of nitrosodimethylanilin hydrochlorid with gallamid. The mass is then boiled for 1 to 2 hours, while adding gradually 8 kilos of hydrochloric acid and 7 kilos of formaldehyde-hydrosulfite. The reaction being accomplished, the mass becomes yellowish green. The alcohol is then distilled off, the remaining mass cooled down and the new leuco derivative precipitated by an addition of common salt.

In these examples the temperatures, proportions of the employed materials and duration of the heating may be varied within certain limits. Instead of formaldehyde-hydrosulfite, pure hydrosulfite B. A. S. F, or other hydrosulfites, hydrosulfite compounds or sulfoxylate compounds can be employed.

What I claim is:

1. The described process for the manufacture of leuco derivatives of gallocyaninarylids and of their sulfo derivates consisting in heating the gallocyaninarylids and their sulfo derivates in an indifferent medium with reducing agents in the absence of an excess of an acid capable to split off the amidoary group.

2. The described process for the manufacture of leuco derivatives of gallocyaninarylids and of their sulfo derivatives consisting in heating the gallocyaninanilids and their sulfo derivates in an indifferent medium with reducing agents in the absence of an excess of an acid capable to split off the amidoaryl group.

3. As new products, the described leuco derivatives of gallocyaninarylids and of their sulfo derivatives, dyeing chromium mordanted fibers pure greenish-blue tints and having the property of being fixed on cotton by a short steaming, the said leuco derivatives being in the form of hydrochlorids soluble in water, being in dry state powders of greenish appearance and dissolving in sulfuric acid to orange to brownish yellow solutions becoming deeper red on addition of an oxidizing agent.

In witness whereof I have hereunto signed my name this 17th day of July 1908, in the presence of two subscribing witnesses.

CHARLES VAUCHER.

Witnesses:
ERNST WAGNER,
AMAND RITTER.